(12) United States Patent
Zhang et al.

(10) Patent No.: US 9,519,151 B2
(45) Date of Patent: Dec. 13, 2016

(54) OPTICAL MULTIPLEXER AND TRANSMITTER OPTICAL SUBASSEMBLY

(71) Applicant: Huawei Technologies Co., Ltd., Shenzhen (CN)

(72) Inventors: Xueming Zhang, Wuhan (CN); Zhengwen Wan, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 14/565,836

(22) Filed: Dec. 10, 2014

(65) Prior Publication Data
US 2015/0177526 A1    Jun. 25, 2015

(30) Foreign Application Priority Data
Dec. 24, 2013   (CN) .......................... 2013 1 0719812

(51) Int. Cl.
*G02B 27/14*    (2006.01)
*G02B 27/10*    (2006.01)
(Continued)

(52) U.S. Cl.
CPC ............. *G02B 27/14* (2013.01); *G02B 6/2713* (2013.01); *G02B 6/2773* (2013.01);
(Continued)

(58) Field of Classification Search
CPC ..... G02B 27/126; G02B 27/14; G02B 27/141; G02B 27/283; G02B 6/2613; G02B 6/272; G02B 6/2746; G02B 6/2773; G02B 6/2793; G02B 6/29362; G02B 6/2938; G02B 6/32; H04J 14/00; H04J 14/02; H04J 14/06; H04J 14/08
(Continued)

(56) References Cited

U.S. PATENT DOCUMENTS 6,782,205 B2 *  8/2004  Trisnadi ............... G02B 6/2713
                                                     398/197
6,819,872 B2 * 11/2004  Farries ................. G02B 6/2861
                                                     398/102
(Continued)

FOREIGN PATENT DOCUMENTS

JP   2010211164 A   9/2010
WO  2012100209 A2   7/2012
WO  2012162217 A2  11/2012

OTHER PUBLICATIONS

Foreign Communication From a Counterpart Application, European Application No. 14196429.6, Extended European Search Report dated Apr. 28, 2015, 6 pages.

*Primary Examiner* — Loha Ben
(74) *Attorney, Agent, or Firm* — Conley Rose P.C.

(57) ABSTRACT

An optical multiplexer and a transmitter optical subassembly are provided that relate to the field of optics communications. A light-combining part is formed by using at least one light combiner that can combine two beams of light into one beam of light, and at least two levels of light-combining parts are used to constitute an optical multiplexer, so that $2^N$ beams of light are combined into one beam by using N level of light-combining parts, thereby reducing a package size and packaging loss, and reducing the complexity of a manufacturing process.

19 Claims, 6 Drawing Sheets

(51) Int. Cl.
*G02B 27/30* (2006.01)
*H04J 14/00* (2006.01)
*G02B 27/12* (2006.01)
*G02B 27/28* (2006.01)
*G02F 1/09* (2006.01)
*G02B 6/293* (2006.01)
*H04J 14/08* (2006.01)
*G02B 6/27* (2006.01)
*H04J 14/02* (2006.01)
*H04J 14/06* (2006.01)

(52) U.S. Cl.
CPC ......... *G02B 6/2938* (2013.01); *G02B 27/126* (2013.01); *G02B 27/283* (2013.01); *G02F 1/093* (2013.01); *H04J 14/00* (2013.01); *H04J 14/08* (2013.01); *G02B 6/272* (2013.01); *G02B 6/2746* (2013.01); *H04J 14/02* (2013.01); *H04J 14/06* (2013.01)

(58) Field of Classification Search
USPC ........................ 359/618, 619, 625–627, 629, 634,359/638–640; 398/43, 58, 76, 77, 79, 85, 94, 398/98, 102, 147, 152
See application file for complete search history.

(56) References Cited

U.S. PATENT DOCUMENTS

| | | | |
|---|---|---|---|
| 7,184,621 B1 | 2/2007 | Zhu | |
| 8,427,749 B2* | 4/2013 | Du | H01S 5/4012 359/618 |
| 8,437,086 B2* | 5/2013 | Du | H01S 5/405 359/618 |
| 8,488,244 B1 | 7/2013 | Li et al. | |
| 2010/0061730 A1 | 3/2010 | Seki et al. | |
| 2012/0189306 A1 | 7/2012 | Du et al. | |
| 2016/0028489 A1* | 1/2016 | Saeki | H04B 10/506 398/79 |

* cited by examiner

OPTICAL MULTIPLEXER AND TRANSMITTER OPTICAL SUBASSEMBLY

CROSS-REFERENCE TO RELATED APPLICATION

This application claims priority to Chinese Patent Application No. 201310719812.7, filed on Dec. 24, 2013, which is hereby incorporated by reference in its entirety.

TECHNICAL FIELD

The present invention relates to the field of optics communications, and in particular, to an optical multiplexer and a transmitter optical subassembly.

BACKGROUND

Currently, a 40 gigabit (G) Quad Small Form-factor Pluggable Plus (QSFP+), 100 G Centum (C) Form-Factor Pluggable 2 (CFP2), and CFP4 optical modules all require a Photonic Integrated Device Transmitter Optical Subassembly (PID TOSA) that collects 4 beams of light emitted by a laser from 4 ports and outputs the light through 1 port. This type of component requires a small size and high density, especially for a 100 G CFP2/CFP4 or a 400 G module. Because a light source needs to meet the local area network (LAN) Emulation Wavelength Division Multiplexing (LANE WDM) or even the Dense Wavelength Division Multiplexing (DWDM) standard, a wavelength interval is small and light combination is especially difficult.

Currently, there are mainly two implementation manners of PID TOSA, which are respectively as follows.

(1) ZigZag Filter optical multiplexor (OMUX) (an optical multiplexer formed by a zigzag optical path filter) light combination solution: as shown in FIG. 1, multiple WDM thin-film filters are connected in series, and different effects of reflection and transmission by the WDM filters on light in different paths are used to eventually combine 4 beams of light on a public port for output. Disadvantages of this solution are as follows. Multiple Thin-Film Filters (TFFs) are required, optical distances of different paths are not balanced, and power of light emitted differs significantly; it is very difficult to insert another optical element into the OMUX, and length of the component is large; costs of multiple WDM TFFs are high; an assembly process is complex, and it is difficult to fabricate the OMUX; and this solution is not suitable for DWDM.

(2) Arrayed Waveguide Grating (AWG) light combination solution: as shown in FIG. 2, in the AWG light combination solution, an arrayed waveguide grating chip is used to combine light output by multiple light sources into one beam for output. Disadvantages of this solution are as follows. Packaging loss is relatively large because of use of the AWG; meanwhile, it is relatively difficult to fabricate the AWG; and the AWG generally works at a constant temperature, which requires temperature control.

It can be learned that current optical multiplexers all have such disadvantages as a large package size, large packaging loss, or a complex manufacturing process.

SUMMARY

Embodiments of the present invention provide an optical multiplexer and a transmitter optical subassembly, so as to reduce a package size and packaging loss, and reduce the complexity of a manufacturing process.

According to a first aspect, an optical multiplexer includes at least two levels of light-combining parts, where each level of light-combining parts includes light combiners whose number is ½ the number of beams of input light of this level, each light combiner is configured to combine two beams of light into one beam, and the optical multiplexer includes at least two different types of light combiners; collimation lenses, where the number of the collimation lenses is the same as the number of light sources and which are disposed between a light source and the first level of light-combining parts; and a focusing lens, disposed behind a light outlet of the last level of light-combining parts.

With reference to the first aspect, in a first possible implementation manner, the light combiner is a polarization beam combiner (PBC) light combiner or a light-splitting prism light combiner.

With reference to the first aspect, in a second possible implementation manner, light combiners in one level of light-combining parts are the same.

With reference to the first possible implementation manner of the first aspect, in a third possible implementation manner, the PBC light combiner includes a PBC configured to combine light input through a first light inlet and light input through a second light inlet into one beam, where the first light inlet directly faces first incident light of the PBC light combiner; a half wave plate, whose optical axis is disposed at a 45-degree angle to a polarization direction of second incident light of the PBC light combiner; and a reflector configured to reflect light output by the half wave plate to the second light inlet of the PBC.

With reference to the first possible implementation manner of the first aspect, in a fourth possible implementation manner, the light-splitting prism light combiner includes a light-splitting prism configured to combine light input through a first light inlet and light input through a second light inlet into one beam, where the first light inlet directly faces first incident light of the light-splitting prism light combiner; a reflector configured to reflect second incident light of the light-splitting prism light combiner to the second light inlet of the light-splitting prism; and a beam absorber, disposed on an opposite side of the second light inlet of the light-splitting prism and configured to absorb light obtained after the light input through the second light inlet is transmitted by the light-splitting prism and light obtained after the light input through the first light inlet is reflected by the light-splitting prism.

With reference to the fourth possible implementation manner of the first aspect, in a fifth possible implementation manner, the light-splitting prism is a 3 decibel (dB) light-splitting prism.

With reference to the first aspect, in a sixth possible implementation manner, the optical multiplexer further includes at least one isolator, disposed between two levels of light-combining parts and configured to isolate light that is reflected from a light output direction.

With reference to the sixth possible implementation manner of the first aspect, in a seventh possible implementation manner, when a next level of light-combining parts includes a PBC light combiner, the isolator is a polarization-related isolator.

According to a second aspect, a transmitter optical subassembly includes the foregoing optical multiplexer, and a laser chip that is used as a light source, where the laser chip is connected to an input end of the optical multiplexer; and a ceramic ferrule that is used for coupling output, where the ceramic ferrule is connected to an output end of the optical multiplexer.

With reference to the second aspect, in a first possible implementation manner, the transmitter optical subassembly further includes a photoelectric detector, connected to the laser chip and configured to monitor power of a light source that is emitted by the laser chip.

Embodiments of the present invention provide an optical multiplexer and a transmitter optical subassembly. A light-combining part is formed by using at least one light combiner that can combine two beams of light into one beam, and at least two levels of light-combining parts are used to constitute an optical multiplexer, so that $2^N$ beams of light are combined into one beam by using N level of light-combining parts, thereby reducing the package size and packaging loss, and reducing the complexity of a manufacturing process.

DESCRIPTION OF EMBODIMENTS

Embodiments of the present invention provide an optical multiplexer and a transmitter optical subassembly. A light-combining part is formed by using at least one light combiner that can combine two beams of light into one beam of light, and at least two levels of light-combining parts are used to constitute the optical multiplexer, so that $2^N$ beams of light are combined into one beam by using N level of light-combining parts, thereby reducing a package size and packaging loss, and reducing the complexity of a manufacturing process.

Figure 1:
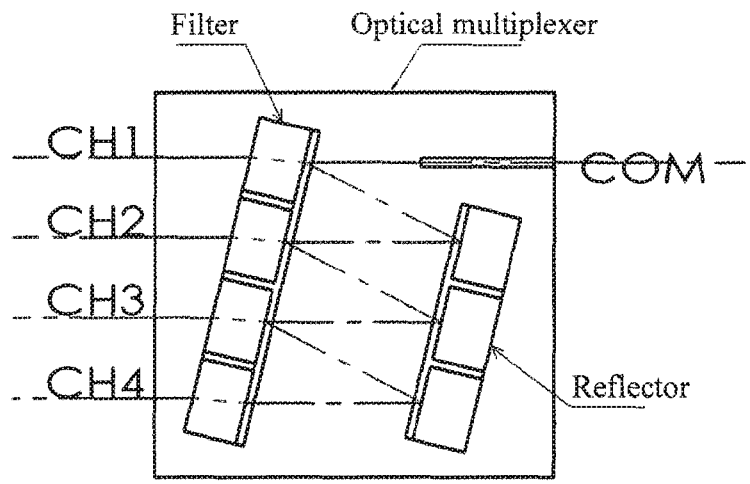
FIG. 1 is a schematic diagram of a ZigZag Filter OMUX light combination solution in the prior art.
Figure 2:
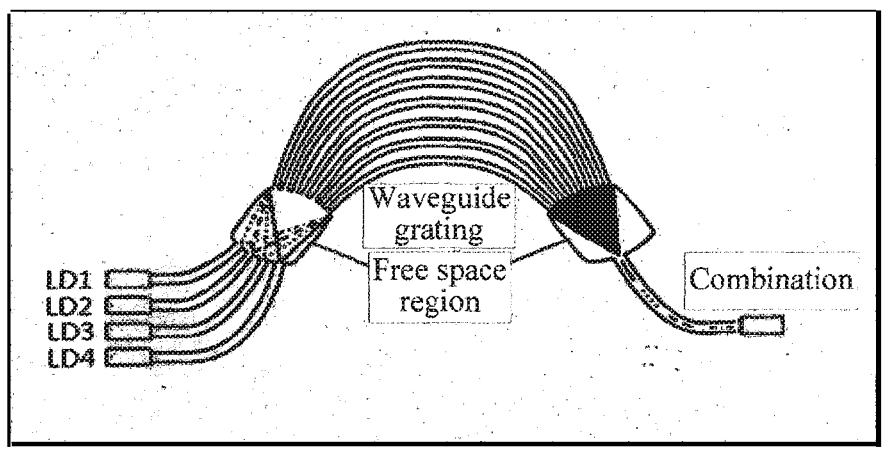
FIG. 2 is a schematic diagram of an AWG light combination solution in the prior art.
Figure 3:
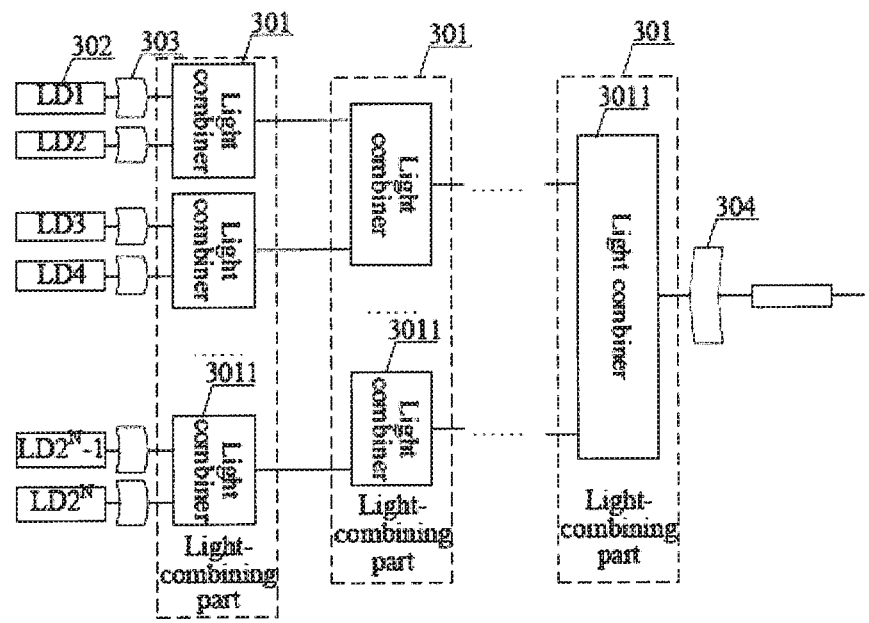
FIG. 3 is a schematic structural diagram of an optical multiplexer according to an embodiment of the present invention.

An embodiment of the present invention provides an optical multiplexer. As shown in FIG. 3, the multiplexer includes at least two levels of light-combining parts 301, where each level of light-combining parts includes light combiners 3011 whose number is ½ the number of beams of input light of this level, each light combiner is configured to combine two beams of light into one beam, and the optical multiplexer includes at least two different types of light combiners; collimation lenses 303, where the number of the collimation lenses 303 is the same as the number of light sources 302, and each disposed between a light source 302 and the first level of light-combining parts 301; and a focusing lens 304, disposed behind a light outlet of the last level of light-combining parts 301.

For an optical multiplexer that includes N level of light-combining parts, light combination of a maximum of $2^N$ beams of light may be implemented, and a difference between optical distances of light in all paths is small, thereby reducing a package size and packaging loss, and reducing the complexity of a manufacturing process of the optical multiplexer.

A light combiner may be as follows a PBC light combiner or a light-splitting prism light combiner.

Certainly, a person skilled in the art may also use another light combiner with a similar function to perform light combination as long as combination of two beams of light into one beam can be implemented.

One optical multiplexer may include multiple light combiners. It is preferable that the optical multiplexer includes at least two different types of light combiners. In this case, a light-combining effect of the optical multiplexer is relatively balanced, and is not easily subjected to influence of an advantage or a disadvantage of one type of light combiners.

Preferably, to facilitate the ease of optimization settings, or to facilitate the ease of inserting another optical component between two levels of light-combining parts, it is preferable that light combiners in one level of light-combining parts are the same.

Figure 4:
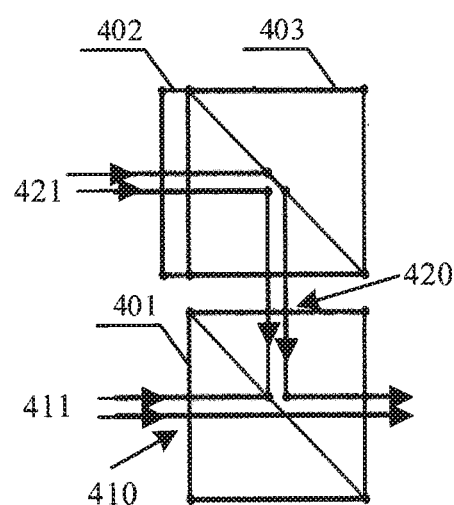
FIG. 4 is a schematic structural diagram of a PBC light combiner according to an embodiment of the present invention.

Further, as shown in FIG. 4, the PBC light combiner includes a PBC 401 configured to combine light input through a first light inlet 410 and light input through a second light inlet 420 into one beam, where the first light inlet 410 directly faces first incident light 411 of the PBC light combiner; a half wave plate 402, whose optical axis is disposed at a 45-degree angle to a polarization direction of second incident light 421 of the PBC light combiner; and a reflector 403 configured to reflect light output by the half wave plate 402 to the second light inlet 420 of the PBC 401.

When the PBC 401 is used to perform light combination, it is required that a polarization direction of the light input through the first light inlet 410 and a polarization direction of the light input by the second light inlet 420 are mutually perpendicular. Therefore, rotation of a polarization direction may be performed on one beam of the light by using the half wave plate 402. An optical axis of the half wave plate 402 is disposed at a 45-degree angle to the polarization direction of the second incident light 421, so that after the second incident light 421 passes through the half wave plate 402, the polarization direction is rotated by 90 degrees and is exactly perpendicular to a polarization direction of the first incident light 411. The light output by the half wave plate 402 is reflected to the second light inlet 420 of the PBC by using the reflector 403, and then light combination may be performed by the PBC.

Figure 5:
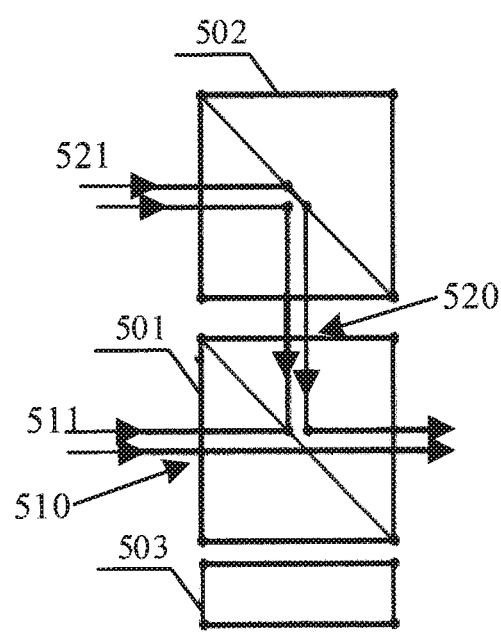
FIG. 5 is a schematic structural diagram of a light-splitting prism light combiner according to an embodiment of the present invention.

Further, as shown in FIG. 5, the light-splitting prism light combiner includes a light-splitting prism 501 configured to combine light input through a first light inlet 510 and light input through a second light inlet 520 into one beam, where the first light inlet 510 directly faces first incident light 511 of the light-splitting prism light combiner; a reflector 502 configured to reflect second incident light 521 of the light-splitting prism light combiner to the second light inlet 520 of the light-splitting prism 501; and a beam absorber 503, disposed on an opposite side of the second light inlet 520 of the light-splitting prism and configured to absorb light obtained after the light input through the second light inlet 520 is transmitted by the light-splitting prism.

The light-splitting prism can reflect a part of incident light and transmit a part of incident light. If a first beam of light transmitted by the light-splitting prism and a second beam of light reflected by the light-splitting prism are emitted from a same angle, light combination by using the light-splitting prism is implemented.

During specific settings, the first light inlet 510 may directly face the first incident light 511 of the light-splitting prism light combiner, and then the second incident light 521 of the light-splitting prism light combiner is reflected to the second light inlet 520 of the light-splitting prism by using the reflector 502, and light obtained after the first incident light 511 is transmitted by the light-splitting prism 501 and light obtained after the second incident light 521 is reflected by the light-splitting prism 501 are exactly combined into one beam. To prevent diffuse reflectance of light obtained after the light input through the second light inlet 520 is transmitted by the light-splitting prism and light obtained after the light input through the first light inlet 510 is reflected by the light-splitting prism, which causes interference to a light source, a beam absorber 503 may be disposed on an opposite side of the second light inlet 520 of the light-splitting prism, so as to absorb the light obtained after the light input through the second light inlet 520 is transmitted by the light-splitting prism and the light obtained after the light input through the first light inlet 510 is reflected by the light-splitting prism.

Further, to obtain a better light combination effect, a 3 dB light-splitting prism may be used as the light-splitting prism. In this case, a ratio of transmitted energy to reflected energy of the incident light of the light-splitting prism is 50:50, that is, 50% energy is transmitted, 50% energy is reflected, and energy of the two beams of light is similar after the two beams of light are combined by the 3 dB light-splitting prism. Certainly, a person skilled in the art may also use a light-splitting prism of another light-splitting ratio according to an actual situation.

Some light-splitting prism light combiners may not include a beam absorber, but share a beam absorber of a neighboring light-splitting prism light combiner.

Preferably, to prevent that light input from a light output direction causes interference to a light source, or to prevent that diffuse reflectance is formed by using an optical element, the optical multiplexer further includes at least one isolator, disposed between two levels of light-combining parts and configured to isolate light that is reflected from a light output direction.

Further, because the PBC light combiner has a polarization direction requirement for incident light, to obtain a better light combination effect, when a next level of light-combining parts includes a PBC light combiner, the isolator is a polarization-related isolator; and when a next level of light-combining parts includes a light-splitting prism, the isolator is a polarization-related isolator or a polarization-unrelated isolator.

In the following, the optical multiplexer provided in the embodiment of the present invention is described in detail by using two specific embodiments.

Embodiment 1

Four beams of light in combination are used as an example for description. In this embodiment, first, 2 PBC light combiners are used as the first level of light-combining parts to combine 4 beams of light into 2 beams of light. Then, one light-splitting prism light combiner is used as the second level of light-combining parts to further combine the 2 beams of light into 1 beam for output.

Figure 6:
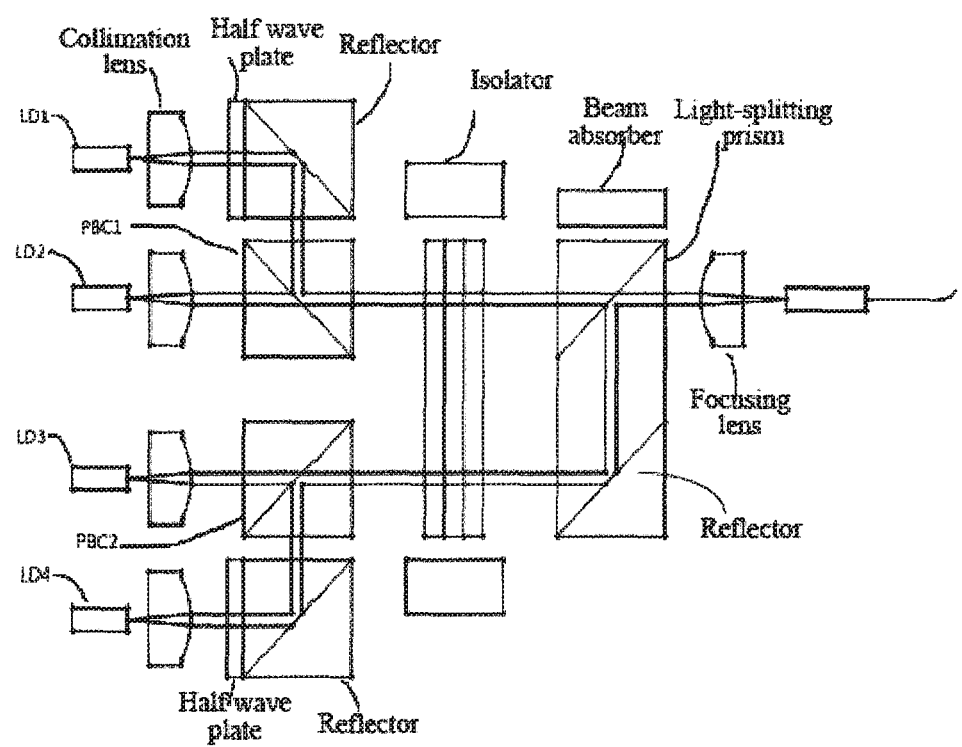
FIG. 6 is a schematic structural diagram of an optical multiplexer that is corresponding to Embodiment 1 according to an embodiment of the present invention.

As shown in FIG. 6, after light emitted by LD1 is collimated by a collimation lens, and is then rotated by 90 degrees by a half wave plate whose optical axis is at a 45-degree angle to a polarization direction of incident light, a polarization direction of the light is exactly perpendicular to a polarization direction of light emitted by LD2; then, after an optical path of the light emitted by LD1 is bent by a reflector, the light emitted by LD1 and the light emitted by LD2 may be combined into one beam of light by using PBC1, and then is incident on a light-splitting prism that is disposed at a 45-degree angle, where the light-splitting prism transmits 50% of energy of the incident light and then continues to propagate the light. Similarly, after light emitted by LD4 is collimated by a collimation Lens and is then rotated by 90 degrees by the half wave plate whose optical axis is at a 45-degree angle to a polarization direction of incident light, a polarization direction of the light is exactly perpendicular to a polarization direction of light emitted by LD3; then, after an optical path of the light emitted by LD4 is bent by a reflector, the light emitted by LD4 and the light emitted by LD3 may be combined into one beam of light by using a polarization beam combiner PBC2, and after the one beam is reflected by a 45-degree reflector, the beam is incident on the same light-splitting prism, and light with 50% energy reflected continues to propagate. By control of positions of the 4 LDs, light that passes through a PBC and a light splitter is exactly combined into one beam, which achieves a purpose of combining 4 beams of light into one beam for output, and is then converged to a same optical fiber after being focused by using a focusing lens. A beam absorber is configured to absorb redundant reflected light of a 3 dB light-splitting prism, so as to prevent from causing optical crosstalk. An isolator is configured to isolate reflected light of the 3 dB light-splitting prism, so as to prevent from causing optical crosstalk and interference to a light source.

Embodiment 2

Four beams of light in combination are used as an example for description. In this embodiment, first, 2 light-splitting prism light combiners are used as the first level of light-combining parts to combine 4 beams into 2 beams of light. Then, one PBC light combiner is used as the second level of light-combining parts to further combine the 2 beams of light into 1 beam for output.

Figure 7:
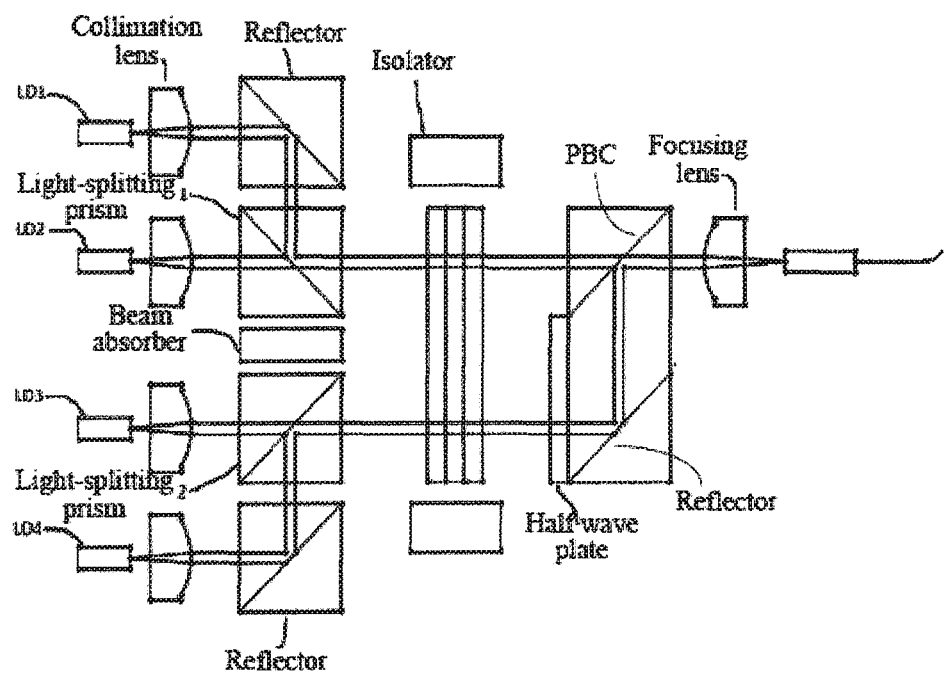
FIG. 7 is a schematic structural diagram of an optical multiplexer that is corresponding to Embodiment 2 according to an embodiment of the present invention.

As shown in FIG. 7, after light emitted by LD1 is collimated by a collimation lens, an optical path of the light emitted by LD1 is bent by a reflector, and 50% energy is reflected by a 3 dB light-splitting prism, the light emitted by LD1 and light that is emitted by LD2 and is with 50% energy transmitted by the 3 dB light-splitting prism are combined into one beam of light. Similarly, after light emitted by LD4 is collimated by a collimation lens, an optical path of the light emitted by LD4 is bent by the reflector, and 50% energy is reflected by a 3 dB light-splitting prism, the light emitted by LD4 and light that is emitted by LD3 and is with 50% energy transmitted by the 3 dB light-splitting prism are combined into one beam of light. Then, combined light of LD3 and LD4 passes through a half wave plate HWP whose optical axis is disposed at a 45-degree angle to a polarization direction of incident light of LD3 and LD4, where after being rotated by 90 degrees by the half wave plate, a polarization direction of the combined light is exactly mutually perpendicular to a polarization direction of combined light of LD1 and LD2. Therefore, a PBC may be used to continue to combine two beams of light of a previous level into one beam of light for output, and then the one beam of light is converged to a same optical fiber after being focused by a focusing lens. An isolator is configured to absorb redundant reflected light of a next level of light-combining parts, so as to prevent from causing optical crosstalk and interference to a light source.

Figure 8:
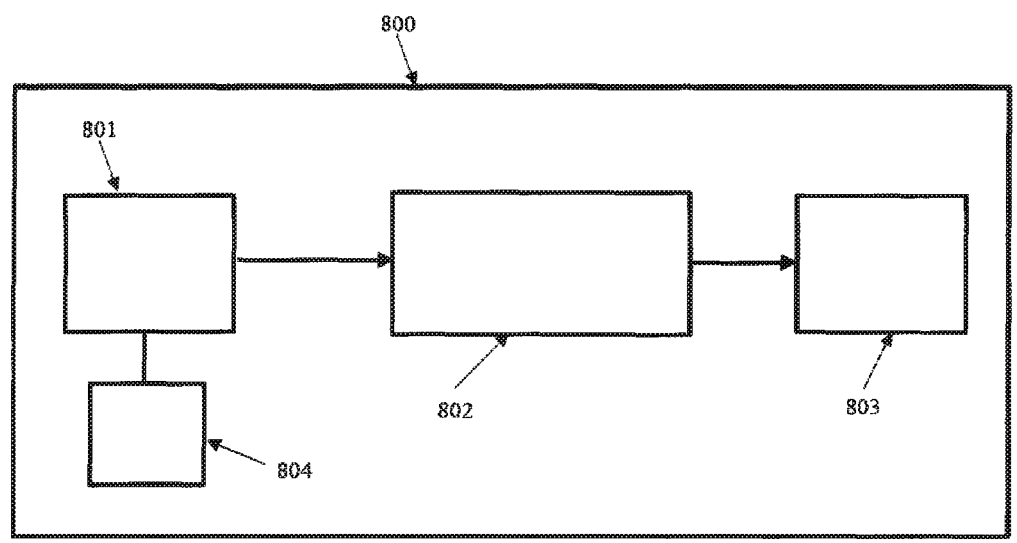
FIG. 8 is a diagram of a transmitter optical subassembly that is corresponding to Embodiment 2 according to an embodiment of the present invention.

As shown in FIG. 8, an embodiment of the present invention further provides a transmitter optical subassembly 800, and the transmitter optical subassembly 800 includes an optical multiplexer 802 provided in an embodiment of the present invention, and a laser chip 801 that is used as a light source, where the laser chip 801 is connected to an input end of the optical multiplexer 802; and a ceramic ferrule 803 that is used for coupling output, where the ceramic ferrule 803 is connected to an output end of the optical multiplexer 802.

Further, the transmitter optical subassembly 800 of the light-emitting device further includes a photoelectric detector 804 connected to the laser chip 801 and configured to monitor power of a light source that is emitted by the laser chip 801.

Further, the light-emitting device further includes a photoelectric detector connected to the laser chip and configured to monitor power of a light source that is emitted by the laser chip.

Further, the transmitter optical subassembly further includes an enclosure that is used for packaging. Preferably, the enclosure is a metal enclosure.

Embodiments of the present invention provide an optical multiplexer and a transmitter optical subassembly. A light-combining part is formed by using at least one light combiner that can combine two beams of light into one beam, and a light-combining part of at least one level constitutes the optical multiplexer, so that $2^N$ beams of light are combined into one beam by using N level of light-combining parts, thereby reducing a package size and packaging loss, and reducing the complexity of a manufacturing process.

Obviously, a person skilled in the art may make various modifications and variations to the present invention without departing from the spirit and scope of the present invention. The present invention is intended to cover these modifications and variations provided that they fall within the scope of protection defined by the following claims and their equivalent technologies.

What is claimed is:

1. An optical multiplexer, comprising:
   at least two levels of light-combining parts, wherein each level of light-combining parts comprises light combiners whose number is half the number of beams of input light of the each level, wherein each light combiner is configured to combine two beams of light into one beam, and wherein the optical multiplexer comprises at least two different types of light combiners;
   collimation lenses, wherein a number of the collimation lenses is the same as a number of light sources, and wherein each of the collimation lenses is disposed between a light source and a first level of light-combining parts; and
   a focusing lens disposed behind a light outlet of a last level of light-combining parts.

2. The optical multiplexer according to claim 1, wherein one type of the at least two different types of light combiners comprises a polarization beam combiner (PBC) light combiner.

3. The optical multiplexer according to claim 2, wherein the PBC light combiner comprises:
   a PBC configured to combine light input through a first light inlet and light input through a second light inlet into one beam, wherein the first light inlet directly faces first incident light of the PBC light combiner;
   a half wave plate whose optical axis is disposed at a 45-degree angle to a polarization direction of second incident light of the PBC light combiner, and
   a reflector configured to reflect light output by the half wave plate to the second light inlet of the PBC.

4. The optical multiplexer according to claim 2, wherein another type of the at least two different types of light combiners comprises a light-splitting prism light combiner, and wherein the light-splitting prism light combiner comprises:
   a light-splitting prism configured to combine light input through a first light inlet and light input through a second light inlet into one beam, wherein the first light inlet directly faces first incident light of the light-splitting prism light combiner;
   a reflector configured to reflect second incident light of the light-splitting prism light combiner to the second light inlet of the light-splitting prism; and
   a beam absorber disposed on an opposite side of the second light inlet of the light-splitting prism and configured to absorb light obtained after the light input through the second light inlet is transmitted by the light-splitting prism and light obtained after the light input through the first light inlet is reflected by the light-splitting prism.

5. The optical multiplexer according to claim 4, wherein the light-splitting prism is a 3 decibel (dB) light-splitting prism.

6. The optical multiplexer according to claim 1, wherein light combiners in one level of light-combining parts are the same.

7. The optical multiplexer according to claim 1, wherein the optical multiplexer further comprises at least one isolator disposed between two levels of light-combining parts and configured to isolate light that is reflected from a light output direction.

8. The optical multiplexer according to claim 7, wherein the at least one isolator is a polarization-related isolator when a next level of light-combining parts comprises a PBC light combiner.

9. The optical multiplexer according to claim 1, wherein one type of the at least two different types of light combiners comprises a light-splitting prism light combiner.

10. A transmitter optical subassembly, comprising:
    an optical multiplexer, wherein the optical multiplexer comprises:
      at least two levels of light-combining parts, wherein each level of light-combining parts comprises light combiners whose number is half the number of beams of input light of the each level, wherein each light combiner is configured to combine two beams of light into one beam, and wherein the optical multiplexer comprises at least two different types of light combiners;
      collimation lenses, wherein a number of the collimation lenses is the same as the number of light sources, each of the collimation lenses being disposed between a light source and a first level of light-combining parts;
      a focusing lens disposed behind a light outlet of a last level of light-combining parts;
      a laser chip that is used as a light source, wherein the laser chip is connected to an input end of the optical multiplexer; and
      a ceramic ferrule that is used for coupling output, wherein the ceramic ferrule is connected to an output end of the optical multiplexer.

11. The transmitter optical subassembly according to claim 10, comprising a photoelectric detector connected to the laser chip and configured to monitor transmitted power of the laser chip.

12. The transmitter optical subassembly according to claim 10, wherein one type of the at least two different types of light combiners is a polarization beam combiner (PBC) light combiner.

13. The transmitter optical subassembly according to claim 12, wherein the PBC light combiner comprises:
 a PBC configured to combine light input through a first light inlet and light input through a second light inlet into one beam, wherein the first light inlet directly faces first incident light of the PBC light combiner,
 a half wave plate, whose optical axis is disposed at a 45-degree angle to a polarization direction of second incident light of the PBC light combiner; and
 a reflector configured to reflect light output by the half wave plate to the second light inlet of the PBC.

14. The transmitter optical subassembly according to claim 12, wherein another type of the at least two different types of light combiners comprises a light-splitting prism light combiner, and wherein the light-splitting prism light combiner comprises:
 a light-splitting prism configured to combine light input through a first light inlet and light input through a second light inlet into one beam, wherein the first light inlet directly faces first incident light of the light-splitting prism light combiner;
 a reflector configured to reflect second incident light of the light-splitting prism light combiner to the second light inlet of the light-splitting prism; and
 a beam absorber disposed on an opposite side of the second light inlet of the light-splitting prism and configured to absorb light obtained after the light input through the second light inlet is transmitted by the light-splitting prism and light obtained after the light input through the first light inlet is reflected by the light-splitting prism.

15. The transmitter optical subassembly according to claim 14, wherein the light-splitting prism is a 3 decibel (dB) light-splitting prism.

16. The transmitter optical subassembly according to claim 10, wherein light combiners in one level of light-combining parts are the same.

17. The transmitter optical subassembly according to claim 10, wherein the optical multiplexer further comprises at least one isolator disposed between two levels of light-combining parts and configured to isolate light that is reflected from a light output direction.

18. The transmitter optical subassembly according to claim 17, wherein the at least one isolator is a polarization-related isolator when a next level of light-combining parts comprises a PBC light combiner.

19. The transmitter optical subassembly according to claim 10, wherein one type of the at least two different types of light combiners comprises a light-splitting prism light combiner.

* * * * *